United States Patent
Impink, Jr. et al.

[11] Patent Number: 5,265,135
[45] Date of Patent: Nov. 23, 1993

[54] INSTRUMENTATION AND CONTROL SCHEME FOR IMPLEMENTING A BORON ISOTOPIC ENRICHMENT PROCESS

[75] Inventors: Albert J. Impink, Jr., Murrysville; Joseph A. Battaglia, Forest Hills, both of Pa.

[73] Assignee: Westinghouse Electric Corp., Pittsburgh, Pa.

[21] Appl. No.: 960,493

[22] Filed: Oct. 13, 1992

[51] Int. Cl.$^5$ .............................................. G21C 7/00
[52] U.S. Cl. .................................... 376/328; 376/313; 423/6; 210/682
[58] Field of Search ............... 376/328, 313, 260, 245; 423/2, 6, 249; 252/626; 210/660, 682

[56] References Cited

U.S. PATENT DOCUMENTS

| | | | |
|---|---|---|---|
| 3,666,626 | 5/1972 | Gramer et al. | 376/328 |
| 4,073,683 | 2/1978 | Van der Schoot | 376/328 |
| 4,225,390 | 9/1980 | Brown et al. | 376/328 |
| 4,280,984 | 7/1981 | Miyake et al. | 423/6 |
| 5,176,885 | 1/1993 | Impink, Jr. et al. | 376/328 |

Primary Examiner—Daniel D. Wasil
Attorney, Agent, or Firm—Peyton C. Watkins

[57] ABSTRACT

An apparatus for providing an inventory of an isotopically enriched acidic solution of an element that is capable of forming a water soluble weakly acidic solution at temperatures amenable to ion exchange and having a lower molecular weight isotope fraction and a higher molecular weight isotope fraction is disclosed. This apparatus includes at least two ion exchangers, each being temperature dependent with respect to their storage capacity of said lower and higher molecular weight isotopes, a hot tank containing a hot tank solution and a cold tank containing a cold tank solution both flow coupled to the ion exchangers. A first series of valves is selectively operable to direct the hot tank solution to one of the ion exchanger and to direct the cold tank solution to the other ion exchangers. A second series of valves is selectively operable to direct the flow from the ion exchangers to either the hot tank or the cold tank. An analyzer for sampling the solution is located upstream from the hot tank. The analyzer analyzes the sample to determine a content of the lower and higher molecular weight isotopes. A digital computer is connected to the analyzer for computing. a switchover signal based on a value of the actual lower molecular weight isotope enrichment flowing into the hot tank and a predicted value of the amount of the lower molecular weight isotope enrichment in the hot tank.

12 Claims, 3 Drawing Sheets

INSTRUMENTATION AND CONTROL SCHEME FOR IMPLEMENTING A BORON ISOTOPIC ENRICHMENT PROCESS

BACKGROUND OF THE INVENTION

1. Field of the Invention

The present invention relates generally to the separation of isotopes by a thermally driven exchange process which utilizes two flow paths that are interconnectable within a system and, more particularly, to such a process which includes a single mass spectrometer operable to switch between flow paths in order to enhance the isotopic separation.

2. Background Information

Natural boric acid solutions containing a Boron 10 (B-10) to Boron 11 (B-11) atomic ratio of 19.8:80.2 are used as control fluids in nuclear power plants. It is known that the B-10 isotope is responsible for nuclear reaction control due to its neutron capturing ability. B-10 enriched boric acid solutions which contain a B-10 to B-11 atomic ratio in excess of 19.8:80.2 are not currently employed in reactor coolant systems since the B-10 enriched solutions may cost as much as $3.00 (U.S.) per gram of B-10 while the reactor grade natural boric acid solution may only cost $1.00 (U.S.) per pound of boron. Therefore, it would be most advantageous to be able to enrich boron-containing products in their B-10 content using an inexpensive process.

A number of methods are known for increasing the B-10 content of common boron compounds, such as by physical or chemical processes or a combination of these two processes. Such methods include distilling, solvent extracting, and ion exchanging the boron compounds.

A thermally driven ion exchange apparatus and method for producing enriched B-10 are described in detail in U.S. Pat. No. 5,176,885 and assigned to the assignee of the present invention. This application teaches a method and apparatus for enriching B-10 content by flowing a boron solution through two interconnecting flow paths having equal flow rates. This system comprises a hot tank and a cold tank, a heater and a cooler, and two resin-containing ion exchangers A and B. The following is a description of the process beginning with the cold tank.

In the flow path originating with the cold tank, boron solution flows out of the cold tank into a heater and thereafter into ion exchanger B. The heated boric acid solution initially preferentially desorbs B-10 when passed through the resin in ion exchanger B. Next, the heated boric acid solution somewhat enriched in B-10 by interaction with the resin in ion exchanger B flows into the hot tank. Simultaneously with the flow initiation of the cold tank loop, the boric acid solution in the hot tank flows into the cooler and thereafter into ion exchanger A. The B-10 in the cooled boric acid solution will initially be preferentially stored on the resin in ion exchanger A. This solution somewhat depleted of boron and particularly of boron-10 by interaction with the resin in ion exchanger A then flows into the cold tank. The above process is continued until a predetermined switchover point occurs and then system valve positions are switched to allow the heated boric acid solution to pass through ion exchanger A and the cooled boric acid solution to pass through ion exchanger B. This process of periodically switching the boric acid solution flow paths is continuously repeated until further cycling will not contribute significantly to B-10 enrichment. The final result is enriched boron in both the hot and cold tanks.

To appreciate the point at which switchover should occur, the relationship between ion exchangers A and B and the hot and cold tanks should be understood. As previously stated, heated boric acid solution when passed through either ion exchanger A or B will initially preferentially elute B-10 containing ions, thus increasing the isotopic ratio the solution passing into the hot tank. Cooled boric acid solution will initially preferentially store B-10 containing iols on the resin in either ion exchanger A or B, thus somewhat decreasing the isotopic ratio of B-10 to B-11 in the solution passing into the cold tank. As time passes, the isotopic ratios of B-10 to B-11 in the ion changers begins to reverse the above-stated trend, such as the ratio of B-10 to B-11 decreasing in the hot ion exchanger and increasing in the cold heat exchanger. This is because the preferential transfer of B-10 from or to the resin decreases resulting in the isotopic ratio of B-10 to B-11 in the hot solution exiting the hot ion exchanger gradually decreasing and the cold solution at the exit of cold ion exchanger is gradually increasing. Switchover should occur when the isotopic ratio of B-10 to B-11 in the hot solution exiting the hot ion exchanger has decreased to a point where it is substantially identical to that in the hot tank at that time.

The switchover point in the copending application referred to above is determined by using two boron isotopic analyzers, such as mass spectrometers. One of the analyzers is connected alternately to ion exchanger A and the hot tank and the other analyzer is connected alternately to ion exchanger B and the hot tank. Due to specific process requirements, only one analyzer will be active at any given time period (the analyzer measuring the heated solution). If, for example, the analyzer connected to ion exchanger A is active, that analyzer will alternately determine the B-10:B-11 ratio at the exit of ion exchanger A and in the hot tank. If the analyzer connected to ion exchanger B is active, that analyzer will determine the B-10:B-11 ratio at the exit of ion exchanger B and in the hot tank.

In this arrangement, the active or on-line analyzer determines the boron content from ion exchanger A or B and then immediately switches to determine the boron content in the hot tank. Since two analyzers are required in this two loop system, they need to be calibrated with each other to ensure accurate and consistent switchover occurs. Obviously, this calibration requirement increases system maintenance downtime and operating costs.

Therefore, what is needed is an improved instrumentation and control scheme which enhances the operation of the two loop boron isotopic enrichment system.

SUMMARY OF THE INVENTION

The present invention provides an improved instrumentation system and control scheme designed to satisfy the aforementioned needs. Particularly, the present invention is directed to a system and process for producing enriched boron in a two loop system wherein switching between loops is accomplished using one sample point monitored by a single analyzer.

In accordance with the present invention, there is provided an apparatus for generating an inventory of isotopically enriched acidic solution of an element that is capable of forming a water soluble weakly acidic solution at temperatures amenable to ion exchange and having a lower molecular weight isotope fraction and a higher molecular weight isotope fraction. The apparatus includes (a) at least two ion exchangers being temperature dependent with respect to their storage capacity of the lower and higher molecular weight isotopes; (b) a hot tank containing a hot tank solution and a cold tank containing a cold solution both flow coupled to the ion exchangers; (c) first valve means for selectively directing the hot tank solution to one of the ion exchangers and for selectively directing the cold tank solution to the other ion exchanger; (d) second valve means for selectively directing the flow from the ion exchangers to either the hot tank or the cold tank; (e) means for heating the cold tank solution located upstream from the ion exchangers and means for cooling the hot tank solution located upstream from the ion exchangers; (f) sampling means for sampling the solution located upstream from the hot tank and for analyzing the sample to determine a content of the lower and higher molecular weight isotopes; and (g) computing means for computing: (i) predicted values of the contents of the lower and higher molecular weight isotopes in the hot tank based upon the content of the lower and higher molecular weight isotopes received from the sampling means; (ii) a predicted value of the enriched lower isotopic weight solution in the hot tank; (iii) an actual value of the enriched lower isotopic weight isotope flowing into the hot tank; and (iv) a switchover signal based on the value of the actual enriched lower isotopic weight isotope flowing into the hot tank and the predicted value of the enriched lower isotopic weight isotope in the hot tank.

BRIEF DESCRIPTION OF THE DRAWINGS

While this specification concludes with claims particularly pointing out and distinctly claiming the subject matter of the invention, it is believed the invention will be better understood from the following description, taken in conjunction with the accompanying drawings wherein:

DETAIL DESCRIPTION OF THE PREFERRED EMBODIMENT

Figure 1:
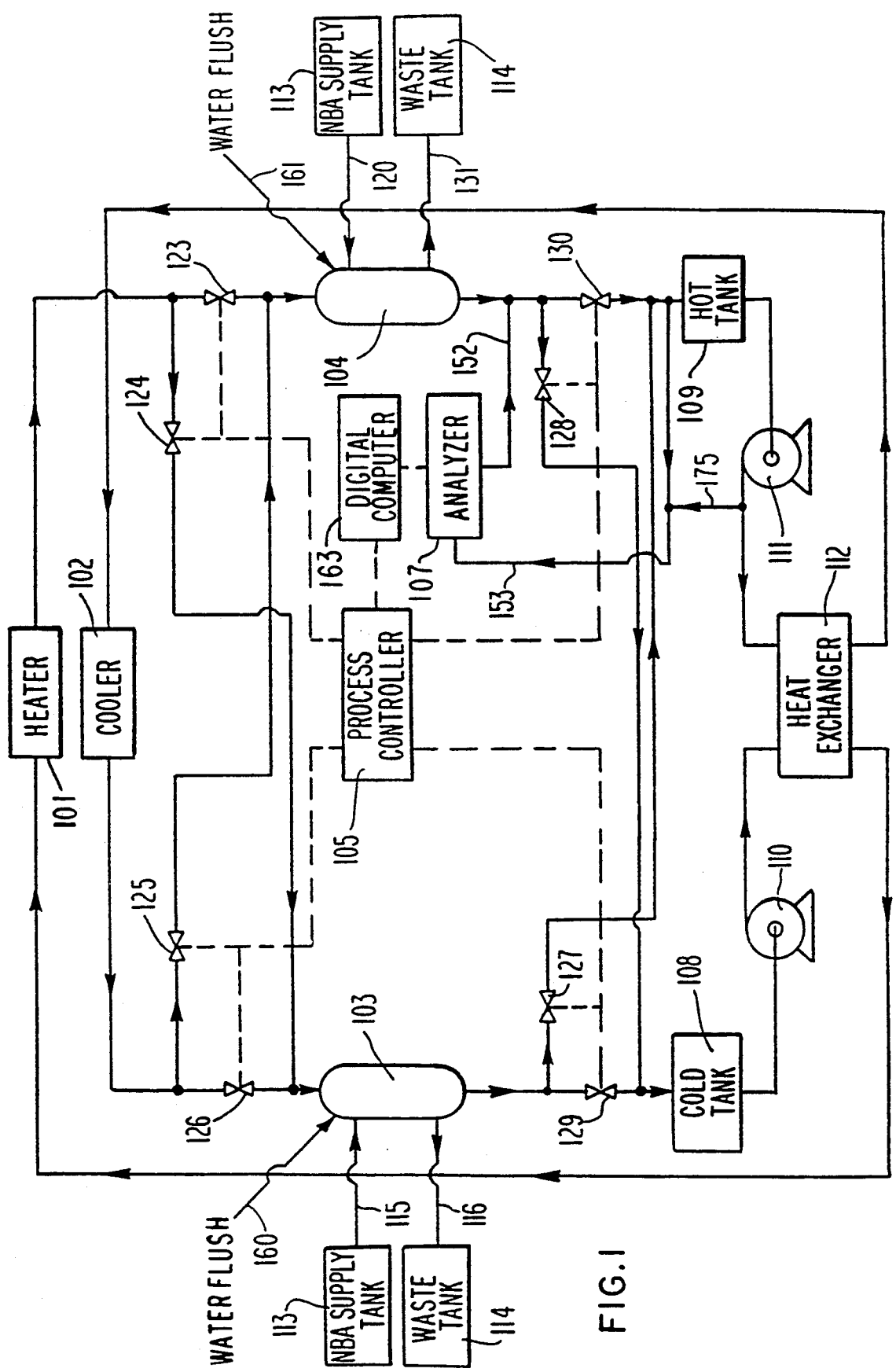
FIG. 1 is a process flow schematic diagram depicting a representative plant configuration to be used to generate a volume of enriched boric acid solution using a single boron analyzer in accordance with the present invention.

In the following description, like reference characters designate like or corresponding parts throughout the several views of the drawings. Also in the following description, it is to be understood that such terms as "forward", "rearward", "left", "right", "upwardly", "downwardly", and the like are not to be construed as limiting terms.

In General

The isotopic enrichment of elements which are capable of forming a water soluble weakly acidic solution, and which incompletely dissociate in an aqueous solution at temperatures amenable to ion exchange, is accomplished by alternating the flow of hot and cold acidic solutions of the element of interest through ion exchange beds. Due to the mass transfer properties of the molecules containing the differing isotopes, and the temperature dependent ion exchange resin desorption and absorption of these molecules, the slight preferential desorption of the lower molecular weight isotope allows for the production of a solution which is isotopically enriched in the lower molecular weight isotope. Although reference is made to the ion exchange of the isotopes, it is noted that the ion exchange process is carried out upon the molecules containing these isotopes in solution.

The process can be adapted for use with such elements as boron, silicon, phosphorous, arsenic, antimony, and other transition elements which form weakly acidic solutions at temperatures amenable to anionic ion exchange. The preferred element is boron, where the goal is isotopic enrichment of a boric acid solution in the B-10 isotope. As used herein, the term B-10 defines the boron isotope having ten (10) nucleons and the term B-11 defines the boron isotope having eleven (11) nucleons. A natural boric acid (NBA) solution has an atomic ratio of B-10 to B-11 isotopes of 19.8:80.2. A solution of boric acid is said to be enriched if the ratio of B-10 to B-11 isotopes is in excess of 19.8:80.2. Such a solution is an enriched boric acid (EBA) solution. The isotopic enrichment apparatus and process will be described referring to the enrichment of boron in a boric acid solution; however, the process should not be limited to the boron element.

Referring now to the drawings and particularly to FIG. 1, there is depicted an EBA generation system using a raw feedstock solution which produces an EBA solution. The raw feedstock solution can be either a NBA solution or an EBA solution; however, a NBA solution is preferred. A final product of EBA is obtained in both the cold tank 108 and the hot tank 109 at the end of the process.

The enrichment of the boric acid solution is accomplished as follows:

The hot tank 109 and the cold tank 108 are filled with a solution of boric acid. The two ion exchangers 103 and 104 and the anion resin, preferably a strong base anion exchange resin, contained therein are saturated with a NBA solution from the NBA supply tank 113 via the NBA supply lines 115, 120. It should be noted that the starting solution to be enriched can be a natural boric acid solution or a solution already enriched in the B-10 isotope to some extent. The preferred starting solution is a NBA solution.

The enrichment process begins by circulating the solution from the cold tank 108 through the ion exchanger 104 and into the hot tank 109. Simultaneously, the solution located in the hot tank 109 is circulated through the ion exchanger 103 and then into cold tank 108. This is accomplished by opening the valves 123, 126, 129, 130, and Closing the valves 124, 125, 127, 128. The solution from the cold tank 108 is circulated through the cold tank pump 110 and through the regenerative heat exchanger 112. The regenerative heat exchanger 112 operates to efficiently exchange thermal energy between the solution flowing from the hot tank 109 and from the cold tank 108. The solution then flows through a device for heating the solution, such as the heater 101, and continues through the ion exchanger 104 and into the hot tank 109. In this manner, molecules containing B-10 isotopes are initially stripped preferentially over molecules containing B-11 isotopes from the resin within the ion exchanger 104 producing a B-10 enriched boric acid solution in the hot tank 109. Simultaneously, the solution in the hot tank 109 is forced from the hot tank 109 by the hot tank pump 111 to the regenerative heat exchanger 112, into a device for cooling the solution such as cooler 102, and then through the ion exchanger 103 and into the cold tank 108. In this way, boric acid is absorbed from the solution onto the resin within the ion exchanger 103. The molecules containing B-10 isotopes are initially preferentially absorbed over the molecules containing B-11 isotopes by the resin in the ion exchanger 103 during this step. Preferably, the mass flow rates through the two ion exchangers 103 and 104 are equal and are held constant throughout a flow pattern cycle so that the liquid levels in the hot tank 109 and the cold tank 108 remain relatively constant.

It is noted that other plant configurations could be proposed to heat the cold tank solution and to cool the hot tank solution prior to the ion exchange step. Any stream from a processing plant system could be employed in a heat exchanger step with the hot tank solution or the cold tank solution. Such engineering options could be readily employed with this system. The cold tank 108, hot tank 109 and regenerative heat exchanger 112 design employed in the preferred embodiment with a heater 101 and cooler 102 as shown in FIG. 1 is one engineering alternative.

The preferred temperature range for the heated solution, upon exiting the heater 101, is about from 120°–160° F. (49° C.–71° C.), and most preferably about 140° F. (60° C.). The preferred temperature range for the chilled solution, upon exiting the cooler 102, is about from 35°–70° F. (1.7° C.–21° C.), and most preferably about 50° F. (10° C.).

The upper temperature limit for heating a solution to be sent through the ion exchangers 103 and 104 is limited by the resin utilized. The highest temperature tolerated by the resin is preferred because the elution of borate ions is enhanced at higher temperatures. The lower temperature limit for cooling a solution to be sent through the ion exchangers 103 and 104 is limited by the possible freezing of the solution. The lowest temperature is preferred because the storing of borate ions is enhanced at lower temperatures.

Figure 2:
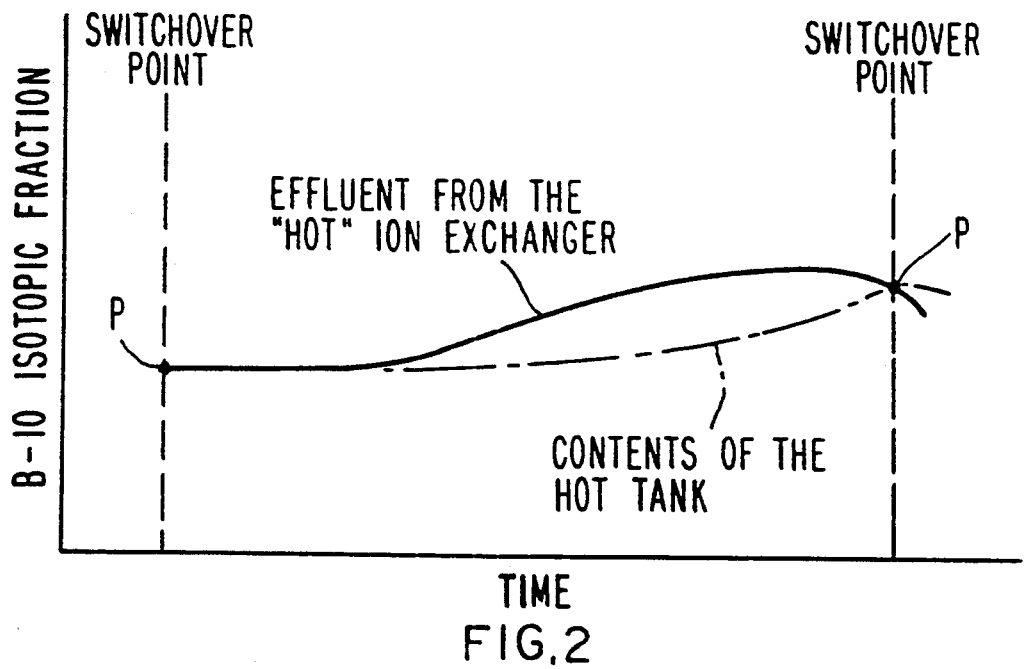
FIG. 2 is a graph indicating the time dependent boron-10 isotope fraction in the effluent from a hot, i.e., boron stripping ion exchange bed.
Figure 3:
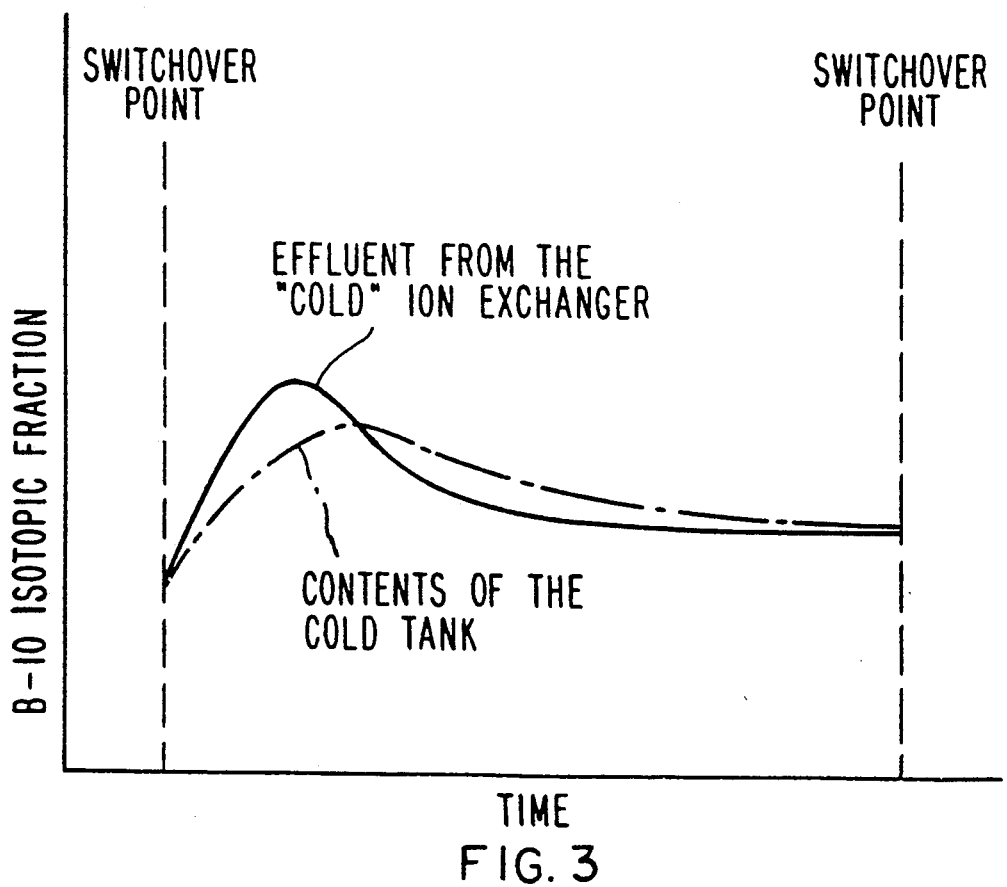
FIG. 3 is a graph indicating the time dependent boron-10 isotope fraction in the effluent from a cold, i.e., boron storing ion exchange bed.

The B-10 concentration of the ion exchanger effluents and the cold tank solution and hot tank solution are shown in relative concentration units in FIG. 2 and FIG. 3. FIG. 2 represents the B-10 isotopic concentration of the effluent from an ion exchanger which has a hot solution circulating therethrough and the B-10 isotopic concentration in the hot tank 109. The preferential desorption of the B-10 isotope is shown by the rise in the B-10 isotopic concentration of the effluent as time proceeds. This increased desorption of B-10 isotopes in relation to B-11 isotopes will eventually decrease as time proceeds.

FIG. 3 represents the B-10 isotopic concentration of the effluent from an ion exchanger which has a cold solution circulating therethrough and the B-10 isotopic concentration in the cold tank 108. The initial peak of relatively enriched boric acid is caused by the fact that the flow of hot and cold solutions are switched between the two ion exchangers 103 and 104 periodically. Therefore, the initial peak is actually due to the residual solution from the prior hot solution circulation step.

The circulation pattern described above is reversed or switched periodically, and the flow from each tank is directed to the other ion exchanger. The switchover is regulated by the value of a "switchover ratio". hot ion exchanger effluent divided by the B-10:B-11 ratio of the solution in the hot tank 109. This quantity is represented by Equation 1:

$$\text{Switchover ratio} = \frac{\text{HOT EFFLUENT } (B\text{-}10 \text{ fraction})/(B\text{-}11 \text{ fraction})}{\text{HOT TANK } (B\text{-}10 \text{ fraction})/(B\text{-}11 \text{ fraction})} \quad (1)$$

The preferred switchover point is shown in FIG. 2 as Point P. The preferred flow pattern reversal occurs when the switchover ratio falls to about 1.0.

Referring to FIG. 1, switchover is accomplished by opening the previously closed valves 124, 125, 127, 128, and closing the previously opened valves 123, 126, 129, 130. The cold tank 108 solution is withdrawn by the cold tank pump 110 and sent through the regenerative heat exchanger 112 into the heater 101, and its flow is directed through the ion exchanger 103 and into the hot tank 109. In this way, molecules containing the B-10 boron isotopes are thermally desorbed from the resin in the ion exchanger 103 preferentially over the molecules containing the B-11 isotopes of boron. Simultaneously, the hot tank 109 solution is withdrawn by the hot tank pump 111 through the regenerative heat exchanger 112 and transferred through the cooler 102 into the ion exchanger 104 and then directed into cold tank 108. In this way, boric acid is absorbed by the resin within the ion exchanger 104, and the molecules containing the B-10 isotopes are preferentially absorbed over the molecules containing the B-11 isotope. Again, it is preferred that the boric acid mass flow rates through the two ion exchangers are approximately equal and held constant during the flow pattern.

The reversed flow is continued while the switchover ratio rises above 1.0 and preferably continues until the switchover ratio falls near 1.0. However, the benefits of the process can be obtained in a less efficient manner by reversing the flow prior to or after the 1.0 switchover value represented by Point P in FIG. 2. This process of alternating the flow from the hot tank 109 and the cold tank 108 through the ion exchanger 103 and ion exchanger 104 is continued until the ratio of B-10:B-11 boron isotopes in the EBA solution reaches the desired level. When the enrichment can no longer practically be improved by the material remaining on the resins within the ion exchangers 103 and 104, the resins may be replenished with a replacement solution of boric acid. This replacement solution may be a NBA or EBA solution, preferably a NBA solution.

Figure 4:
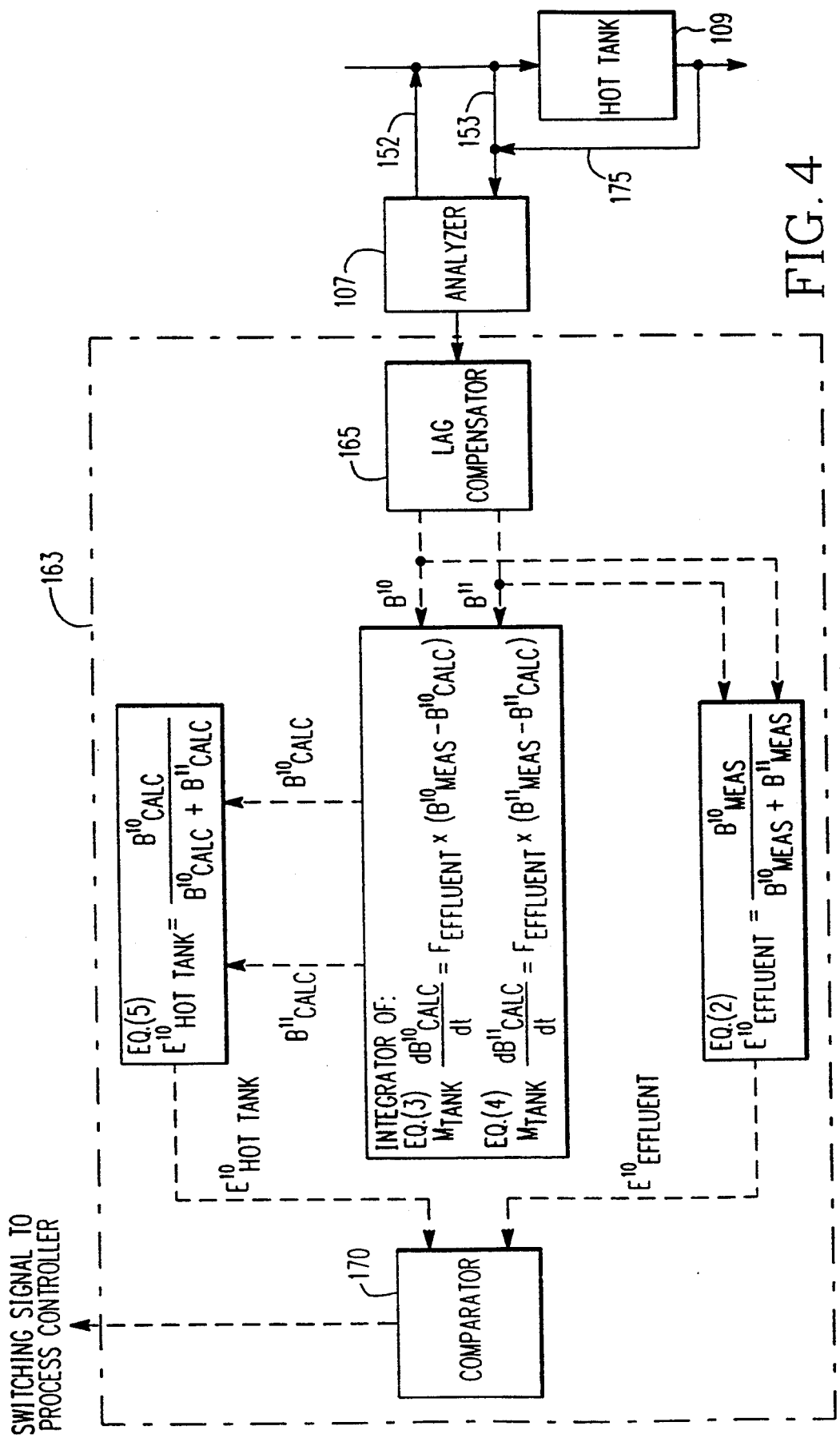
FIG. 4 is a partial view of the process flow schematic diagram illustrating in detail a method and apparatus of determining the switchover point in accordance with the present invention.

Referring to FIGS. 1 and 4, the valves 123, 124, 125, 126, 127, 128, 129, and 130 are all controlled by a process controller 105. The process controller 105 functions to open and close the valves 123, 124, 125, 126, 127, 128, 129, and 130 when the switchover point is reached. The process controller 105 receives its signal to accomplish switchover from digital computer 163 wherein computations are performed from boron content analysis obtained from analyzer 107.

Scheme of the Present Invention

In view of the above description, a novel instrumentation and control scheme is described herein below for providing a switchover signal in accordance with the present invention.

Again referring to FIGS. 1 and 4, an analyzer 107 is provided for sampling a solution of boron upstream from the hot tank 109. The preferred B-10 boron isotope analyzer 107 is a mass spectrometer, for example, a Thermionic Quadrupole Mass Spectrometer THQ commercially available from Finnigan MAT, San Jose, Calif. The analyzer 107 samples a solution of boron upstream from the hot tank 109 via pipe 153 and then determines the absolute B-10 and B-11 contents of the solution in grams of isotope per gram of solution, for example, and transmits this information to a lag compensator 165 contained within a digital computer 163. Once the analyzer 107 determines the B-10 and B-11 contents, the sample is returned to the outlet of ion exchanger 104 via pipe 152. The function of lag compensator 165 will be explained later in greater detail. The digital computer 163 compares the B-10 enrichment in the solution flowing into the hot tank 109 with the predicted B-10 enrichment in the hot tank 109, based on the boron-10 and boron-11 concentrations obtained from the lag compensator 165. To obtain the B-10 enrichment in the hot tank 109 (Eq. 5), the digital computer 163 performs a series of calculations to predict the B-10 and B-11 concentrations (Eq. 3 and 4) in the hot tank 109 on the basis of the samples taken upstream from the hot tank 109. The digital computer 163 then predicts the B-10 enrichment (Eq. 5) in the hot tank 109 from this predicted B-10 and B-11 concentrations flowing into the hot tank 109. To obtain the B-10 enrichment in the solution flowing into the hot tank 109, digital computer 163 performs a calculation (Eq. 2) to place the B-10 and the B-11 measured from analyzer 107 into a weighted relationship with each other.

With regard to the B-10 enrichment of the solution flowing into the hot tank 109, the digital computer 163 utilizes the B-10 and B-11 concentrations measured by the analyzer 107 from the solution as inputs to Eq. 2 to obtain the B-10 enrichment in the effluent flowing into the hot tank 109.

$$E\text{-}10(\text{Effluent}) = \frac{B\text{-}10(\text{Measured})}{B\text{-}10(\text{Measured}) + B\text{-}11(\text{Measured})} \quad (2)$$

This calculated value of the B-10 enrichment in the effluent is then transmitted to a comparator 170 wherein it is compared with the B-10 enrichment in the hot tank 109 as described below.

In regard to B-10 enrichment in the hot tank 109, the digital computer 163 performs a series of calculations to determine the B-10 enrichment in the hot tank 109. First, the digital computer 163 respectively predicts the B-10 concentration in the hot tank 109, via equation 3 and the B-11 concentration in the hot tank 109 via equation 4.

$$M(\text{tank}) \frac{dB\text{-}10(\text{Calc})}{dt} = F(\text{effluent}) \times \quad (3)$$

$$[B\text{-}10(\text{Measured}) - B\text{-}10(\text{Calc})]$$

$$M(\text{tank}) \frac{dB\text{-}11(\text{Calc})}{dt} = F(\text{effluent}) \times \quad (4)$$

$$[B\text{-}11(\text{Measured}) - B\text{-}11(\text{Calc})]$$

F(effluent) is the mass flow rate of boric acid solution into and out of hot tank 109. B-10 (calc) and B-11(calc) are calculated mass fractions of the two boron isotopes (grams of isotope per gram of solution) in hot tank 109.

Next, the digital computer 163 utilizes the B-10 and B-11 values calculated from Eqs. 3 and 4, respectively in a weighted relationship to each other to determine the B-10 enrichment in the hot tank 109. This weighted relationship is determined by Eq. 5:

$$E\text{-}10(\text{Hot Tank}) = \frac{B\text{-}10(\text{Calc})}{B\text{-}10(\text{Calc}) + B\text{-}11(\text{Calc})} \quad (5)$$

The B-10 enrichment in the hot tank 109 as expressed in Eq. (5) is then transmitted to the comparator 170. The comparator 170 compares the B-10 enrichment in the hot tank 109 with that of the solution flowing into the hot tank 109. If the B-10 enrichment in the solution flowing into the hot tank 109 is less than or equal to the B-10 enrichment in the hot tank 109, the comparator 170 generates a signal to process controller 105 to switch flow paths.

It should be understood that a time delay will occur between the time the sample is taken and the time the digital computer 163 performs its calculations. For example, while the digital computer 163 is calculating the B-10 enrichment in the hot tank 109 and in the solution flowing into the hot tank 109, the sample taken and analyzed has progressed further through the flowpath. To account for this delay, the instrumentation and control scheme of the present invention may utilize a lag compensator 165, which itself is well known in the art. The lag compensator 165 accounts for a time delay between the time a sample is taken flowing from either ion exchanger and the time the flow reaches the hot tank. In an alternative embodiment, the process piping (not shown) can be configured so that the time needed for the solution to flow through the process piping to the inlet of hot tank 109 and the time delays of measurement and calculation are equal.

Referring to FIG. 4, it will be appreciated that a method and apparatus of verifying the calculated B-10 and B-11 in the hot tank 109 can be obtained for internal cross calibration purposes. In this regard, additional piping 175 is installed so that the solution from hot tank 109 may be sampled. When there is no flow through the ion exchangers or heat exchangers, the analyzer 107 samples the effluent from the hot tank 109 via pipe 175 and determines the actual B-10 and B-11 concentrations. The digital computer 163 will then compare the predicted B-10 and B-11 concentrations in the hot tank 109 with the measured mass concentrations.

It is thought that the present invention and many of its attendant advantages will be understood from the foregoing description and it will be apparent that various changes may be made in the form, construction and arrangement without departing from the spirit and scope of the invention or sacrificing all of its material advantages, the form hereinbefore described being merely a preferred or exemplary embodiment thereof.

We claim:

1. An apparatus for generating an inventory of an isotopically enriched acidic solution of an element that is capable of forming a water soluble weakly acidic solution at temperatures amenable to ion exchange having a lower molecular weight isotope fraction and a higher molecular weight isotope fraction comprising:
  (a) at least two ion exchangers, each being temperature dependent with respect to their storage capacity of said lower and higher molecular weight isotopes;
  (b) a hot tank containing a hot tank solution and a cold tank containing a cold tank solution both flow coupled to said ion exchangers;
  (c) first valve means for selectively directing the hot tank solution to any of said ion exchangers and for selectively directing the cold tank solution to any of said ion exchangers;
  (d) second valve means for selectively directing the flow from said ion exchangers to one of said hot tank and cold tank;
  (e) means for heating the cold tank solution located upstream from said ion exchangers;
  (f) means for cooling the hot tank solution located upstream from said ion exchangers;
  (g) sampling means for sampling the solution located upstream from said hot tank and for analyzing the sample to determine a content of the lower and higher molecular weight isotopes; and
  (h) computing means for computing:
    (i) a predicted value of the amount of the lower and higher molecular weight isotope in said hot tank from the amount of the lower and higher molecular weight isotopes received from said sampling means;
    (ii) a predicted value of the enrichment in the lower molecular weight isotope in said hot tank based on the results of the computation set forth in (h)(i) above;
    (iii) an actual value of the enrichment in the lower molecular weight isotope in the solution flowing into said hot tank; and
    (iv) a switchover signal based on the actual value of the enrichment in the lower molecular weight isotope in the solution flowing into said hot tank and the predicted value of the enrichment in the lower molecular weight isotope in said hot tank.

2. The apparatus as recited in claim 1 wherein the element is boron, the lower molecular weight isotope is boron 10 (B-10) and the higher molecular weight isotope is boron 11 (B-11).

3. The apparatus as recited in claim 2 wherein the predicted value of the B-10 in said hot tank is calculated from an equation:

$$M(\text{tank}) \frac{dB\text{-}10(\text{Calc})}{dt} = F(\text{effluent}) \times [B\text{-}10(\text{Measured}) - B\text{-}10(\text{Calc})].$$

4. The apparatus as recited in claim 3 wherein the predicted value of the B-11 is calculated from an equation:

$$M(\text{tank}) \frac{dB\text{-}11(\text{Calc})}{dt} = F(\text{effluent}) \times [B\text{-}11(\text{Measured}) - B\text{-}11(\text{Calc})].$$

5. The apparatus as recited in claim 4 wherein B-10 enrichment in said hot tank is determined from the equation:

$$E\text{-}10(\text{Hot Tank}) = \frac{B\text{-}10(\text{Calc})}{B\text{-}10(\text{Calc}) + B\text{-}11(\text{Calc})}.$$

6. The apparatus as recited in claim 5 wherein the B-10 enrichment in the hot effluent is determined from the equation:

$$E\text{-}10(\text{Solution}) = \frac{B\text{-}10(\text{Measured})}{B\text{-}10(\text{Measured}) + B\text{-}11(\text{Measured})}.$$

7. The apparatus as recited in claim 6 wherein said sampling means includes a mass spectrometer.

8. The apparatus as recited in claim 7 wherein said computing means is a digital computer.

9. The apparatus as recited in claim 8 wherein the switchover point is defined as the point when the boron 10 enrichment in the hot effluent stream decreases below the value of the concurrently increasing boron 10 enrichment in said hot tank.

10. The apparatus as recited in claim 9 further comprising a lag compensator accounting for a time delay between the time a sample is taken flowing from either ion exchanger and the time the flow reaches said hot tank.

11. The apparatus as recited in claim 10 further comprising:
  (a) a comparator for comparing the B-10 enrichment in said hot tank and in the effluent flowing into said hot tank and generating a signal when the switchover point occurs for switching flowpaths; and
  (b) a process controller for receiving the signal from said comparator and operable in response to said signal to switch flowpaths.

12. An apparatus for producing an inventory of boron 10 enriched boric acid from a solution containing boron 10 and boron 11 molecular weight isotopes comprising:
  (a) at least two ion exchangers, each being temperature dependent with respect to their storage capacity of the B-10 and the B-11 molecular weight isotope;
  (b) a hot tank containing a hot tank solution and a cold tank containing a cold tank solution both flow coupled to said ion exchangers;
  (c) first valve means for selectively directing the hot tank solution to one of said ion exchangers and for directing the cold tank solution to the other one of said ion exchangers;
  (d) second valve means for selectively directing the flow from said ion exchangers to either of said hot tank or cold tank;
  (e) means for heating the cold tank solution located upstream from said ion exchangers;
  (f) means for cooling the hot tank solution located upstream from said ion exchangers;
  (g) sampling means for sampling the solution located upstream from said hot tank and for analyzing the sample to determine a content of the B-10 and B-11 isotopes; and
  (h) means for computing:
    (i) a predicted value of the amount of B-10 and B-11 in said hot tank from the amount of B-10 and B-11 received from said sampling means;
    (ii) a predicted value of the amount of B-10 in said hot tank, based on the results of the computation set forth in (h)(i) above;
    (iii) an actual value of the enriched B-10 flowing into said hot tank; and
    (iv) a switchover signal based on the actual value of the enriched B-10 flowing into said hot tank and the predicted value of the enriched B-10 in said hot tank.

* * * * *